Apr. 3, 1923.
L. L. MOORE.
BOLL WEEVIL TRAP.
FILED JUNE 20, 1921.
1,450,382.
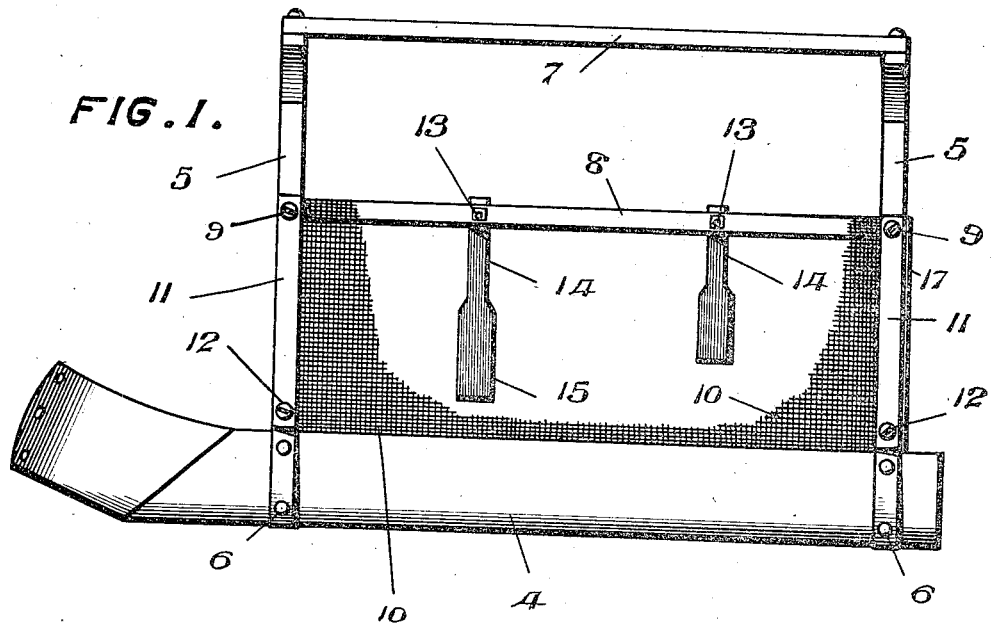
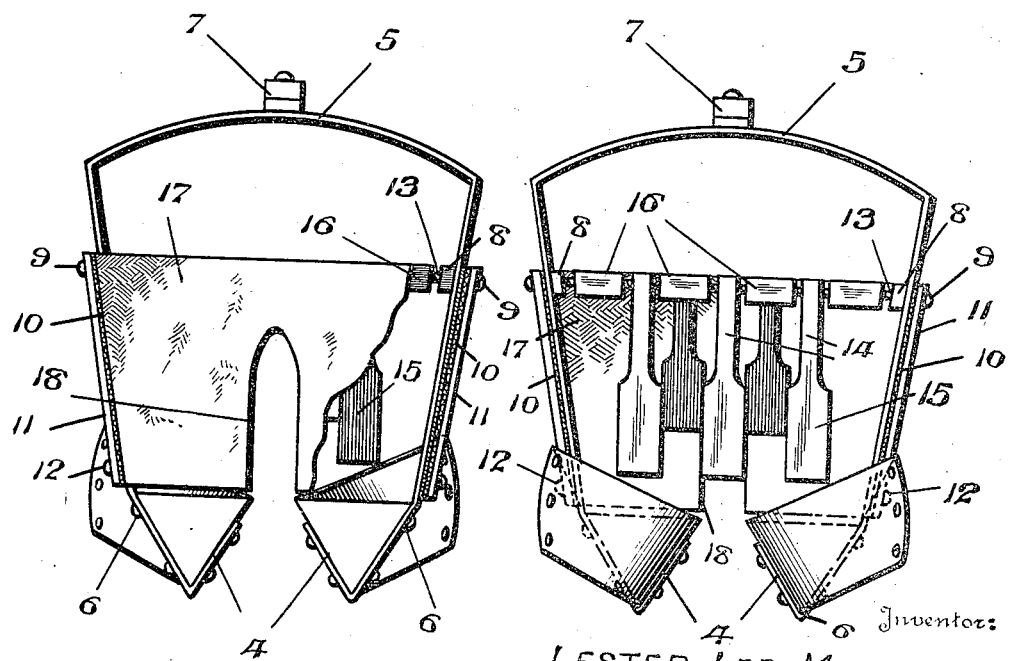
LESTER LEE MOORE,
By Monroe E. Miller
Attorney.

Patented Apr. 3, 1923.

1,450,382

UNITED STATES PATENT OFFICE.

LESTER LEE MOORE, OF WINDER, GEORGIA.

BOLL-WEEVIL TRAP.

Application filed June 20, 1921. Serial No. 478,869.

*To all whom it may concern:*

Be it known that I, LESTER L. MOORE, a citizen of the United States, residing at Winder, in the county of Barrow and State of Georgia, have invented a new and useful Boll-Weevil Trap, of which the following is a specification.

The present invention relates to a portable trap adapted to be moved by hand over or astride a row of cotton or other growing plants for the purpose of dislodging boll-weevils, insects, or bugs from the vegetation for capturing and destroying them, and the object of the invention is the provision of a trap of that character having novel and improved features of construction to enhance the utility and efficiency thereof.

The invention is illustrated in the accompanying drawing, wherein—

Figure 1 is a side elevation of the trap, portions of the side screens being broken away.

Fig. 2 is a front view of the device.

Fig. 3 is a rear view of the device, portions being broken away.

The device comprises a pair of parallel longitudinal metal pans 4 of trough-like formation, of V-shaped cross section, which are spaced apart to provide a slot between them for accommodating the plants over which the device is moved. These pans or troughs are filled with liquid poison so that the insects dropped into the pans will be exterminated.

The front and rear bows or arches 5, formed from bars of metal, are located near the opposite ends of the pans, and their terminals are formed with V-shaped hooks 6 fitted under and secured to the opposite sides of the pans, thereby seating and mounting the pans in the hooked terminals of the bows or arches. The bows and pans are secured together by rivets or other suitable securing elements. A longitudinal handle bar 7 is secured at its opposite ends on the crown or yoke portions of the bows 5, for conveniently enabling the device to be lifted and carried by hand.

Longitudinal side bars 8 are secured at their ends, as at 9, to the side portions of the bows 5 at suitable distances above the pans and below the handle bar 7, and side screens 10 of wire are disposed between the bars 8 and outer sides of the pans 4. Said screens or panels 10 have their upper edges overlapping and secured to the bars 8, and their lower edges extending to the outer walls or sides of the pans, with the opposite ends of the screens or panels clamped between the side portions of the bows 5 and cleats or strips 11 located at the outer sides of said bows. The upper ends of the strips 11 are engaged by the securing elements 9, and the lower ends of said strips are secured to the bows by suitable securing elements 12. The screens or panels 10 will prevent the insects, when loosened from the plants, from escaping out the sides above the pans, or falling outwardly over the outer sides of the pans.

Agitating means are provided for dislodging the insects from the plants above the pans. Thus, transverse rods 13 extend across the pans between the bows 5, and have their terminals engaged through the side bars 8. Transversely spaced pendulums 14 are suspended loosely from said rods 13, to swing forwardly and rearwardly but not sidewise, so as to swing forwardly and rearwardly only, and the lower ends of the pendulums are widened, as at 15, for increasing their weight and to present broader surfaces to the plants. The pendulums 14 are spaced apart by means of spacers 16 on the rods 13.

A rear screen of panel 17, preferably of cloth, extends across the rear bow 5 below the rear ends of the bars 8 to the rear ends of the pans 4, and the side edges of said screen or panel 17 are preferably also clamped between the rear bow 5 and rear strips or cleats 11. The screen or panel 17 has a slot 18 extending upwardly from the slot or space between the pans, through which the plants can pass out of the trap when moving the device over a row of plants.

In using the device, it is carried by the handle bar 7 and moved over the row of plants, and the pendulums 14 in striking the plants will agitate and shake the plants, thereby dislodging the insects therefrom, which willl fall into the pans or troughs 4. The pendulums serve as oscillating beaters and will effectively loosen the insects from the plants. The side screens or panels 10 prevent the insects from falling outwardly over the outer sides of the pans, and the rear screen or panel 17 prevents the insects from escaping to the rear over the rear ends of the pans, although the slot 18 enables said rear screen or panel to pass over the plants. The rods 13 not only serve as supports for the pendulums, but also connect the opposite side bars 8, to make the frame more rigid.

Having thus described the invention, what is claimed as new is:—

1. A portable trap to be moved over plants comprising spaced longitudinal pans, front and rear bows having their lower terminals secured to said pans, a longitudinal handle bar secured on said bows, longitudinal side bars secured to the side portions of said bows, a transverse rod engaging said side bars to brace said bars and bows, side screens secured to the side portions of the bows and extending from said side bars to the outer walls of the pans, weighted pendulums suspended on said rod for independent forward and rearward swinging movement only and having broad lower end portions above the pans, and means on the rod for spacing the pendulums apart.

2. A portable trap to be moved over plants comprising spaced longitudinal pans, and arched frame secured at its terminals to the pans and including a transverse rod therein above the pans, weighted pendulums suspended on said rod for independent forward and rearward swinging movement only, and means on the rods for spacing the pendulums apart.

In testimony whereof I affix my signature.

LESTER LEE MOORE.